United States Patent [19]

Stolov et al.

[11] Patent Number: 4,927,240
[45] Date of Patent: May 22, 1990

[54] MULTIPLE LIQUID CRYSTAL DISPLAY

[76] Inventors: Michael Stolov; Adi Stolov, both of 25 Hapoel Street, Nof-Yam, Israel

[21] Appl. No.: 236,293

[22] Filed: Aug. 25, 1988

Related U.S. Application Data

[63] Continuation of Ser. No. 797,464, Nov. 13, 1985, abandoned, which is a continuation-in-part of Ser. No. 552,379, Nov. 16, 1983, Pat. No. 4,580,876.

[30] Foreign Application Priority Data

Nov. 2, 1983 [IL] Israel ............................. 70115

[51] Int. Cl.$^5$ ............................................. G02F 1/13
[52] U.S. Cl. ..................................... 350/335; 350/337; 350/408
[58] Field of Search ................ 340/765, 784; 350/333, 350/335, 408, 337

[56] References Cited

U.S. PATENT DOCUMENTS

| | | | |
|---|---|---|---|
| 4,025,164 | 5/1977 | Dorigozzi et al. | 350/408 |
| 4,099,855 | 7/1978 | Wisbey et al. | 350/335 |
| 4,228,574 | 10/1980 | Culley et al. | 350/337 |
| 4,231,639 | 11/1980 | Banda | 350/335 |
| 4,294,524 | 10/1981 | Stolov | 350/333 |
| 4,364,039 | 12/1982 | Penz | 350/335 |
| 4,375,317 | 3/1983 | Funada et al. | 350/335 |
| 4,410,887 | 10/1983 | Stolov et al. | 340/784 |
| 4,547,043 | 10/1985 | Penz | 350/335 |

OTHER PUBLICATIONS

Robert et al., "Multiplexing Techniques for Liquid--Crystal Displays," *IEEE Transactions on Electron Devices*, vol. ED-24, No. 6, Jun. 1977, pp. 694-697.

*Primary Examiner*—Bruce Y. Arnold
*Assistant Examiner*—Martin Lerner
*Attorney, Agent, or Firm*—Fleit, Jacobson, Cohn, Price, Holman & Stern

[57] ABSTRACT

There is provided a multilayer liquid crystal display of the twisted nematic type which comprises at least two liquid crystal layers and at least three polarizers, the sequence of which is described in detail. The device of the invention is characterized by an extremely high contrast ratio and makes possible very fast switching which is of importance for many applications. When a sequence of more than two liquid crystal layers, with a required number of polarizers is used, very high contrast ratios can be attained.

8 Claims, 1 Drawing Sheet

MULTIPLE LIQUID CRYSTAL DISPLAY

This application is a continuation of application Ser. No. 797,464 filed Nov. 13, 1985, which is a continuation-in-part application of Ser. No. 552,379, filed Nov. 16, 1983, now U.S. Pat. No. 4,580,876 issued Apr. 8, 1986.

BACKGROUND OF THE INVENTION

In patent application Ser. No. 552,379 now U.S. Pat. No. 4,580,876 issued Apr. 8, 1986 there is described a transparent substratum structure for use in the construction of large-scale liquid crystal displays, said transparent substratum structure comprising:

a transparent base plate (of sufficient thickness to rigidify said substratum structure);

a transparent elastic layer, one side of said transparent elastic layer being hermetically bonded to one side of said transparent base plate; and a glass plate of a thickness of between 0.1 mm to 0.6 mm, said transparent base plate being of a sufficient thickness, greater than said thickness of said glass plate, to rigidify said glass plate, one side of said glass plate being hermetically bonded over its entire area to the outer side of said transparent elastic layer (and one side of said transparent base plate being bonded to the other side of said transparent elastic layer), the other side of said glass plate (adapted to be) being bonded to a liquid crystal layer provided with spacing means, said spacing means being supported by a base plate and by said other side of said glass plate and said glass plate being of sufficient thickness to adjust itself to follow an uneven contour of the liquid crystal layer resulting in a uniform thickness of said liquid crystal layer.

The present patent application has been divided out from said patent application.

RELATION TO OTHER PATENT APPLICATIONS

The present patent application is a continuation-in-Part of patent application of U.S. patent application Ser. No. 552,379 filed on Nov. 16, 1983 now U.S. Pat. No. 4,580,876 issued Apr. 8, 1986.

Foreign Application Prior Data: Nov. 2, 1983.

SUMMARY OF THE INVENTION

Conventional liquid crystal displays have unique advantages compared with other types of displays, but they have the serious drawback of rather low contrast and also comparatively slow switching time, which prevent the use of these in a number of possible fields of application. According to the present invention there are provided multilayer liquid crystal displays, containing at least two liquid crystal layers and at least three polarizers, which provide a very high contrast and which make possible fast switching. The displays of the invention are of simple construction, they are inexpensive and can be produced in comparatively large sizes. The contrast which is obtained is that of the contrast of the one liquid crystal display times that of the other, when a twin-layer display is produced; it has a contrast of that of the first, times the second times the third if a triple layer liquid crystal display is used, etc. There are of course provided the required electrodes, spacers, separating transparent sheets and polarizers, as set out in detail hereinafter.

The third polarizer in a double-liquid crystal display is provided between the two liquid crystal layers, and the two others are provided at the two outer surfaces of the display.

The effect of multiplication of the contrast ratio is only obtained when the third polarizer is located between the two liquid crystal layers. If a larger number of consecutive liquid crystal layers are used in a multilayer display, there must be provided polarizers between adjacent liquid crystal layers in order to attain the special phenomenon of contrast increase of the present invention. The provision of a thin resilient layer, as disclosed in the copending application No. 552,379, makes possible the construction of large-area displays of this type, with a high uniformity of the thickness of the liquid crystal display layers.

It was found that a liquid crystal display can reach its full contrast, if the energizing time exceeds the internal processing time, which depends on the liquid crystal material and the thickness of the liquid crystal layer, at a given temperature. The energizing time must be at least $T_{en} = t_d + 1.4\ t_r + 1.4\ t_f$ Here is: $T_{en}$—minimum energizing time; $t_d$—delay time; $t_r$—rise time; $t_f$—fall time.

If the energizing time of the liquid crystal device is less than indicated in the above formula, a poor contrast occurs as a result. The best high speed liquid crystal displays produced now, offer contrast ratios in the 5:1 range. The poor contrast is one of the reasons why liquid crystal devices cannot yet replace the conventional Cathode-ray tube.

According to the present invention, a triple polarizer, double liquid crystal layer as in FIG. 1 display will boost the contrast of the display back to an acceptable range, i.e.

$$C_t = (5.1)^2 = 25:1.$$

As the liquid crystal display itself is inexpensive, the double crystal layer construction of the display will not have a considerable influence on the total price of the apparatus in which it will be used.

As it was said above, the thickness of the liquid crystal layer has an important influence on the internal processing time. If the liquid crystal layer is thinner- the switching time can be faster. Using the method described in the above mentioned U.S. patent application Ser. No. 552,379, a very thin and uniform cell spacing can be achieved. Practically, a spacing of 2 to 3 micrometers with a tolerance in the nanometers' range was achieved. Both, the above U.S. Ser. No. 552,379 patent application together with the present Divisional Application, provide a very fast and high contrast liquid crystal display, useful in many applications, as for example high speed light shutters and high resolution matrix displays. In practice, the switching time borders now on the nanosecond range.

DESCRIPTION OF THE PREFERRED EMBODIMENT

The invention is illustrated in the following by way of examples only. This is by way of illustration, in conjunction with the attached drawings which are of a schematical nature and not according to scale, and in which:

BRIEF DESCRIPTION OF THE DRAWING

FIG. 1 illustrates another embodiment of the invention, consisting of a combination of two liquid crystal displays in an integral unit. This twin-display comprises in combination outer thick glass plates 3 and 4, on which there are provided respectively transparent electrodes 5 and 6, the inner surface of the two plates being in contact with liquid crystals 7 and 8 respectively, which are in touch with thin glass plates 11 and 12 respectively, to which there are attached transparent electrodes 9 and 10 respectively, An optional resilient elastic transparent layer 14 is provided between the two glass plates, while 13 designates a polarizer. In constructions wherein the liquid crystal substance is of the twisted nematic type, there are advantageously provided external polarizers 1 and 2 respectively, on the outer surfaces of the sheets 3 and 4. For large displays there are provided spacers, between the plates 3 and 11, and between plates 12 and 4, and which define the spacing and thus the thickness of the liquid crystal layer; 15 and 16 are spacing frames. Due to the provision of the elastic layer 14, the thin glass plates adapt themselves to the said spacers and result in a uniform spacing between the electrodes facing each other. With such twin-displays, with two single liquid crystal displays, an interesting phenomenon has been discovered.

a. When the liquid crystal layers are of the twisted nematic type, and when a third polarizer (such as 13) is provided between them, an extremely high contrast is obtained which approaches the product of multiplication of the contrast values of each of the displays. If one has a value of say 10:1, and the other 15:1 the resulting contrast value is of the order of 150:1.

b. This makes possible the production of a twin liquid crystal display with good contrast and excellent light output if three slightly polarizing sheets of high transmittance are used.

Reference is made to our U.S. Pat. Nos. 4,295,514 and 4,410,887. A color or multicolor liquid crystal display of very high contrast can be obtained when a color or multicolor layer as defined in the above patents, is provided for in the space between the two thin glass or internal transparent substrates sheets 11 and 12 of FIG. 1. and between inward glass plates or internal transparent substrates 22, 25, 29, 31.

Figure 1:
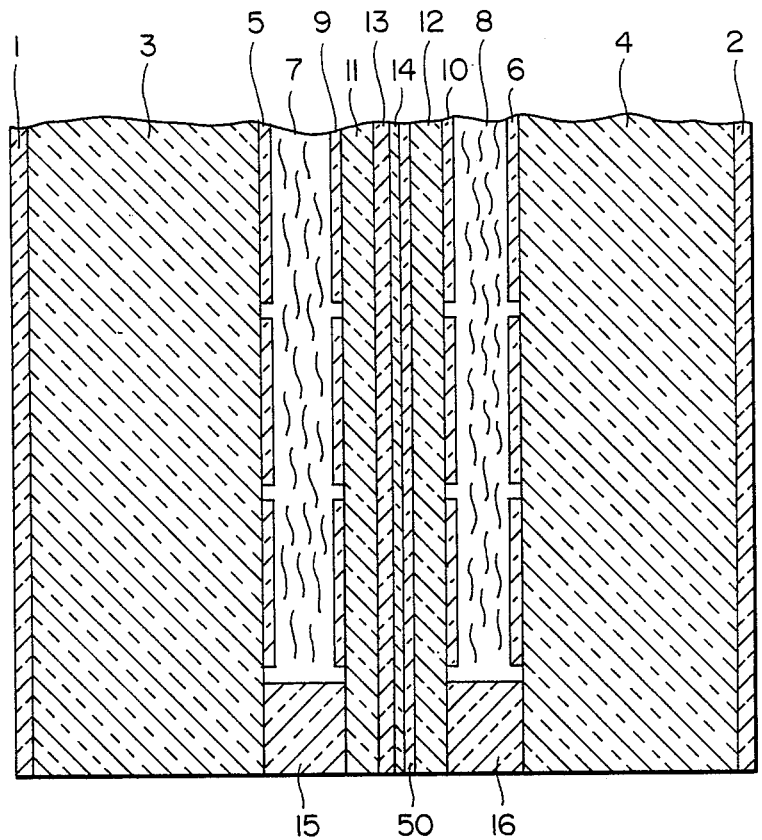
FIG. 1 is a partial sectional side-view of a display according to the present invention comprising two liquid crystal layers.
Figure 2:
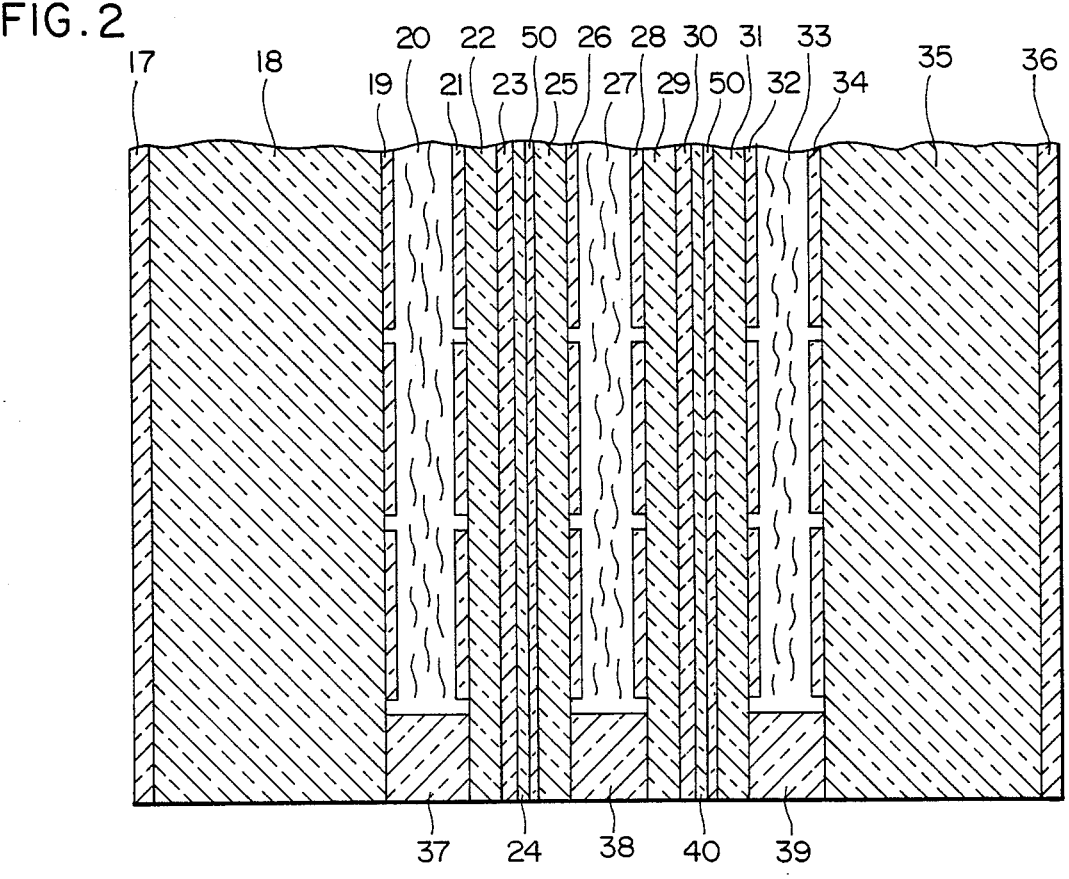
FIG. 2 is a partial sectional side-view of such device which comprises three liquid crystal layers.

Following the idea showed in FIG. 1 and explained above, a liquid crystal display of extreme high contrast can be designed, as it is disclosed in FIG. 2. This display is assembled from three parts, comprising three liquid crystal layers 20; 27; and 33; and have two inward polarizers 23 and 30. If for example the contrast of each part is equal to 20:1, the total contrast of the triple liquid crystal display become $Ct = 20:1 \cdot 20:1 \times 20:1 = 20^3 := 8000:1$. The result sounds unusual new and useful.

In general, the contrast of a multilayer liquid crystal display, according to the present invention is: $Ct = C_1^n$, where $Ct$ is the total contrast of the whole display, $C_1$ is the contrast of one liquid crystal part, "n" is the number of liquid crystal layers. The number of the inward polarizers $NP = n - 1$. Total, together with the outward polarizers $N_{pt} = n + 1$.

In the FIG. 2 members 18 and 25 are outward glass plates, 22, 25 and 31 are the inward glass plates, 19, 21, 26, 28, 32 and 34 are transparent electrodes, 17 and 36 are outward polarizers, 37, 38 and 39 are sealing frames, 24 and 40 are optional resilient layers, in case of a large liquid crystal, as it was in detail described in the U.S. patent application Ser. No. 552,379.

We claim:

1. A multilayer liquid crystal display providing high contrast, said multilayer liquid crystal display, comprising the sequence of:
   a first polarizer applied to one surface of a first glass plate, said first glass plate having on a second surface a first transparent electrode,
   a first liquid crystal layer of the sort which twists the plane of polarization applied with one of its surfaces to said first transparent electrode and with the second surface to a second transparent electrode disposed on one surface of a second glass plate, said second glass plate applied with the second surface to one surface of a second polarizer, said second polarizer applied with the second surface to one surface of a third glass plate, said third glass plate having on a second surface a third transparent electrode, and
   a second liquid crystal layer of the sort which twists the plane of polarization, applied with one surface to said third transparent electrode and with the second surface to one surface of a fourth transparent electrode disposed on one surface of a fourth glass plate, having on the second surface a third polarizer, wherein said first liquid crystal layer and said second liquid crystal layer can be energized simultaneously causing high contrast compared with a single cell liquid crystal display.

2. A multilayer liquid crystal display, as in claim 1, wherein at least one said transparent electrode comprises a number of electrodes on the same substrate which can be energized separately and independently.

3. A multilayer liquid crystal display providing high contrast, comprising an arrangement as in claim 1 and additionally in sequence:
   a fifth glass plate, applied with one surface to the other surface of the said third polarizer, having on the second surface a fifth transparent electrode, and
   a third liquid crystal layer sandwiched between said fifth transparent electrode and a sixth transparent electrode which is disposed on one surface of a sixth glass plate, having on the second surface a fourth polarizer, wherein said first liquid crystal layer, said second liquid crystal layer and said third liquid crystal layer can be energized simultaneously causing a very high contrast compared with a single or double liquid crystal display.

4. A multilayer liquid crystal display, as in claim 3, wherein at least one said transparent electrode is a number of electrodes on the same surface which can be energized separately and independently.

5. A multilayer liquid crystal display as in claim 1, wherein at least one said polarizer comprises two layers of polarizer material.

6. A multilayer liquid crystal display as in claim 1, comprising a color or multicolor filter or filters applied to any surface of the multilayer liquid crystal display.

7. A multilayer liquid crystal display as in claim 6, wherein said color or multicolor filter, is achieved by coloring any part of the multilayer liquid crystal display.

8. A multilayer liquid crystal display as in claim 1, further comprising passive, or active elements with semi-conductors mounted on at least one said transparent electrode.

* * * * *